July 24, 1962 J. W. MOMBERG ET AL Re. 25,203
MOTOR CONTROL SYSTEM
Original Filed May 20, 1959
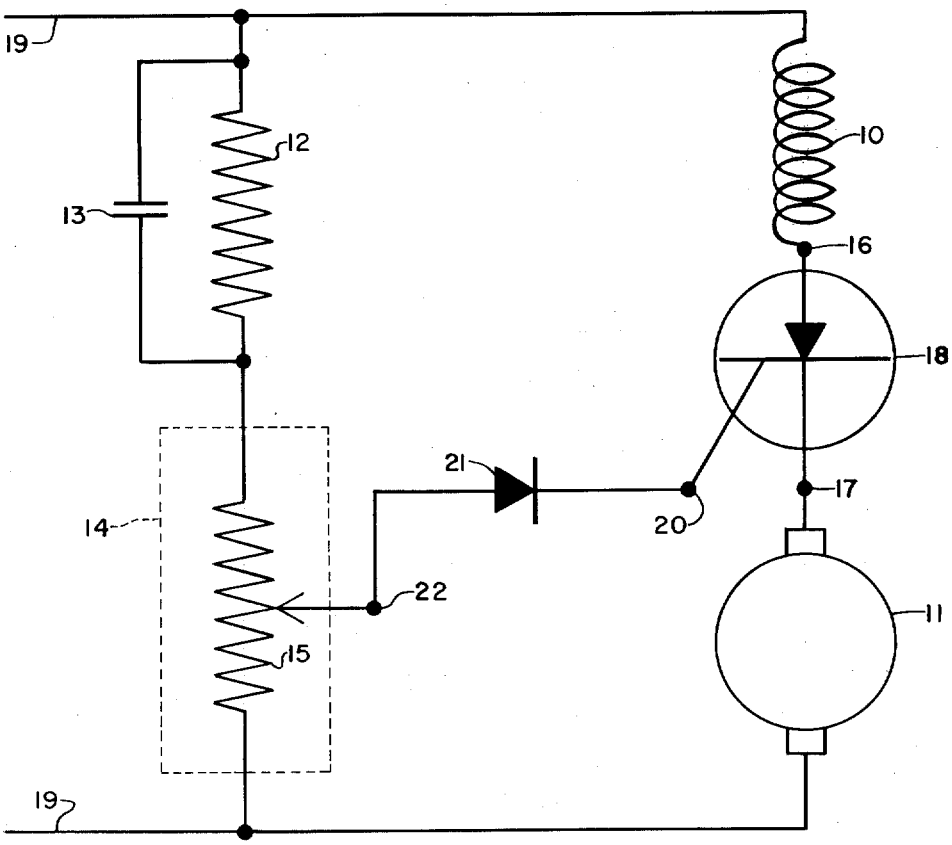
INVENTORS
James W. Momberg
BY Edward W. Taylor
Marshall J. Breen
ATTORNEY United States Patent Office Re. 25,20

Reissued July 24, 196

25,203

MOTOR CONTROL SYSTEM

James W. Momberg, Somerville, and Edward W. Taylor, Martinsville, N.J., assignors to The Singer Manufacturing Company, Elizabeth, N.J., a corporation of New Jersey Original No. 2,939,064, dated May 31, 1960, Ser. No. 814,626, May 20, 1959. Application for reissue Apr. 4, 1961, Ser. No. 101,041

7 Claims. (Cl. 318—246)

Matter enclosed in heavy brackets [ ] appears in the original patent but forms no part of this reissue specification; matter printed in italics indicates the additions made by reissue.

This invention relates to motor control systems and more particularly to systems for controlling the speed of small, series, commutator motors fed from a supply of alternating current.

It has been common practice to use speed-responsive make-and-break governors for interrupting the voltage applied to series type motors for the purpose of controlling the speed thereof. This has not been successful for a number of reasons among which may be mentioned contact wear adversely affecting the useful life and inertia effects causing sluggish response.

Another type of speed control system uses a vibrating relay operated from the unbalance of a bridge circuit caused by the varying back E.M.F. of the motor armature. This latter is exemplified by the United States Patent No. 2,747,153, and the system of the present invention may be considered an improvement thereover.

It is an object of this invention to provide a speed control system for a series commutator motor, which system shall have fast response and require no make-and-break contacts.

It is a further object of this invention to provide a speed control system for a series commutator motor requiring a few small, simple, rugged components.

It is another object of this invention to provide a motor speed control system in which the speed control element is a solid state controlled rectifier.

With the above and other objects in view, as will hereinafter appear, the invention comprises the devices, combinations and arrangements of parts hereinafter set forth and illustrated in the accompanying drawing of a preferred embodiment of the invention, from which the several features of the invention and the advantages attained thereby will be readily understood by those skilled in the art.

The single FIGURE is a circuit diagram illustrating a preferred embodiment of the invention and will be recognized as a bridge circuit arrangement with the motor field winding 10 and the motor armature winding 11 forming two legs of the bridge. The other two legs of the bridge are formed by a fixed resistance 12 shunted by a capacitor 13 and by a potentiometer 14 which provides a variable leg resistance 15. The setting of potentiometer 14 determines the speed of the motor as will be described.

The field and armature windings 10 and 11 are connected respectively to the anode and cathode terminals 16 and 17 of a silicon solid state controlled rectifier 18.

A supply 19 of alternating current voltage is connected between the junction of the fixed resistance 12 and the field winding 10 and the junction of the armature winding 11 and the potentiometer resistance 15.

The gate terminal 20 of the controlled rectifier 18 is connected through a crystal diode 21 to the slider 22 of the potentiometer 14 and the diode polarity is such as to allow only positive voltage to be applied to the gate terminal. It will be seen that the voltage applied to the gate 20 of the controlled rectifier is the unbalanced voltage of the bridge rectified by the diode 21.

The solid state controlled rectifier 18 is a PNPN typ C35B available commercially from the General Electri Company and is characterized by having a fast respons time and high current rating. The crystal diode 21 is conventional IN485 germanium diode. The fixed resis ance 12 is a 5 watt 4000 ohm wire-wound unit and th potentiometer 14 is a conventional 3 watt 1000 ohm uni in a circuit suitable for controlling a conventional serie commutator motor for driving a family sewing machine The capacitor 13 is a 0.47 mfd., 400 volt paper unit.

OPERATION

The fixed resistance 12 and the potentiometer resistanc 15 form a voltage divider, variable by means of a slid ing tap 22 for setting a reference voltage for the gat 20. The back E.M.F. generated by the rotation of th armature 11 is positive toward the cathode and negativ toward the gate and so acts as a negative bias on th gate.

Assume that the armature is rotating at a speed set by the potentiometer 14. If the voltage divider formed by the resistances 12 and 15 were not present to apply a reference voltage, the controlled rectifier 18 would be biased off and the motor would coast to a stop. But the setting of the potentiometer 14 is such that the reference voltage overcomes the bias voltage at a certain motor speed and fires the controlled rectifier. In firing, the motor speeds up and increases the back E.M.F. to overcome the reference voltage and render the controlled rectifier non-conducting. Thus, the rectifier 18 acts like a switch to turn on and off current to the motor at a rate necessary to provide a predetermined speed set by the potentiometer 14.

The capacitor 13, shunted across the resistance 12, provides a time constant of sufficient duration to cause firing of the controlled rectifier in proper sequence while it maintains a compatible phase relationship with the voltage across the field winding.

Having thus set forth the nature of the invention, what we claim herein is:

1. In an electrical control system, the combination with an electric motor having series-connected armature and field windings, of a solid state controlled rectifier having anode, cathode and gate terminals for controlling the flow of current to said motor, a fixed resistance, a potentiometer resistance having a sliding tap, said resistances forming with said armature and field windings a bridge circuit with the anode-cathode terminals of the controlled rectifier inserted in series between said armature and field windings, a diode connected in series between the sliding tap and the gate terminals of the controlled rectifier, and [a source of alternating-current voltage connected between] the junction of the fixed resistance and the field winding and the junction of the potentiometer resistance and the armature winding *being adapted to be connected to a source of alternating-current voltage.*

2. A speed control system for an electric motor having series-connected armature and field windings, comprising a fixed resistance and a potentiometer resistance connected in series across a *pair of terminals* [source of alternating-current voltage], a movable tap for said potentiometer resistance, a solid state controlled rectifier having anode, cathode and gate terminals and connected between and in series with the armature and field windings such that the anode terminal connects to the field winding and the cathode terminal connects to the armature winding, the other ends of said windings being connected to said *pair of terminals,* [source of alternating-current voltage,] *said pair of terminals being adapted to be connected to an A.C. source* and a diode connected between said movable tap and said gate terminal of the trolled rectifier, the diode having such polarity as to ply positive voltage to the gate terminal.

. A system in accordance with claim 2 in which a acitor is connected in shunt with the fixed resistance.

. A system for controlling the speed of a commuta- motor having series-connected armature and field ıdings, comprising a solid state controlled rectifier hav- an anode, a cathode, and a gate, a source of al- nating current voltage, said rectifier being connected ween and with its anode-cathode circuit in series with armature and field windings and the source, a fixed istance, a potentiometer resistance, said resistances ing connected in series across said source, a slider for d potentiometer resistance and a diode connected in ies with said slider and the gate of said rectifier, the ed resistance and the field winding forming adjacent s of a bridge circuit.

5. In a system for controlling the speed of an electric otor having series-connected armature and field wind- gs, a four-legged bridge circuit comprising a fixed sistance, a potentiometer resistance, the armature wind- g and the field winding, a solid state PNPN controlled ctifier having an anode, a cathode and a gate, said ctifier being connected between and with its anode- thode circuit in series with said armature and field indings, a slider for said potentiometer, a diode con- ected between the slider and the gate of the controlled ctifier, and a source of alternating-current voltage con- ected across the junction of the fixed resistance and e field winding and the junction of the potentiometer sistance and the armature winding.

6. A bridge circuit for controlling the speed of an ectric motor having series-connected armature and field indings fed from a source of A.C. voltage comprising fixed resistance and a potentiometer resistance series connected to said source, a solid state controlled rectifier having an anode, a cathode and a gate, said rectifier having its anode connected to one end of the field winding and its cathode connected to one end of the armature winding, the other ends of said windings being connected to said source, a slider for said potentiometer, and a diode connecting said slider to the gate of said controlled rectifier.

*7. In an electrical control system, the combination of an electric motor adapted to be connected to an alternating current source and having series-connected armature and field windings, a solid state controlled rectifier having an anode-cathode circuit connected in series with and separating said armature and field windings and having a gate-cathode control-circuit, a signal channel including said motor armature for transmitting to said gate-cathode control-circuit the back E.M.F. of said motor as negative bias therefor, adjustable means adapted to be energized to produce a reference signal, and means connecting said reference signal in series opposition to said motor back E.M.F., whereby said solid state rectifier is controlled by the difference between said reference signal and said motor back E.M.F.*

References Cited in the file of this patent or the original patent

UNITED STATES PATENTS

| | | |
|---|---|---|
| 2,552,206 | Moyer | May 8, 1951 |
| 2,733,395 | Brown | Jan. 31, 1956 |
| 2,977,523 | Cockrell | Mar. 28, 1961 |

OTHER REFERENCES

Publication: Controlled Rectifiers Drive A.-C. and D.-C. Motors by W. R. Seegmiller, November 13, 1959 issue of "Electronics."